W. BARTHOLOMEW.
CENTRIFUGAL EXTRACTOR BUSHING.
APPLICATION FILED NOV. 3, 1917.
1,316,076.
Patented Sept. 16, 1919.
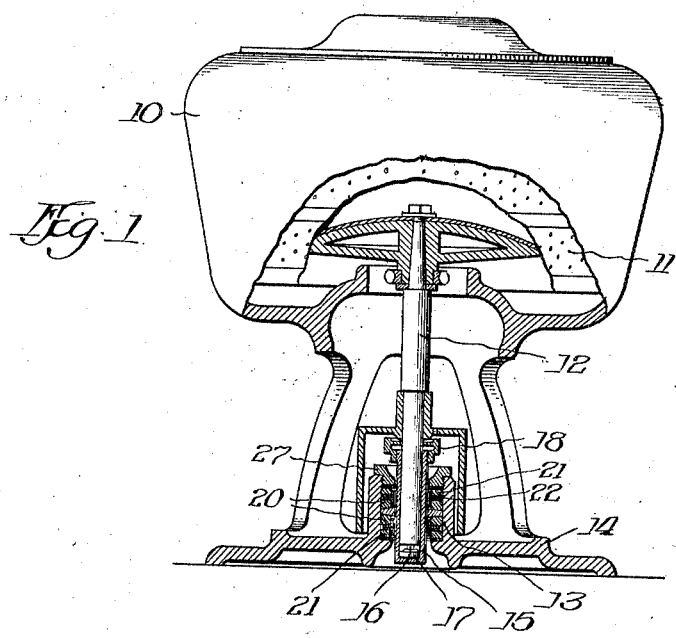
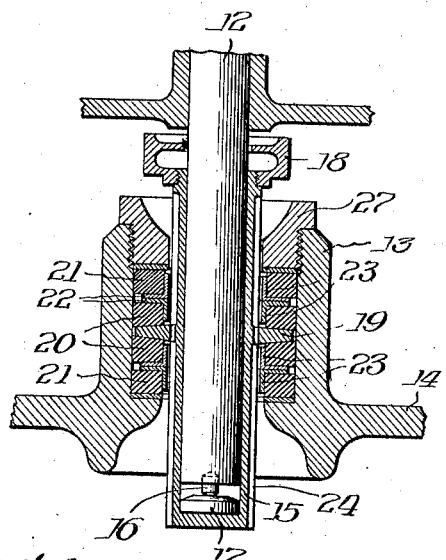
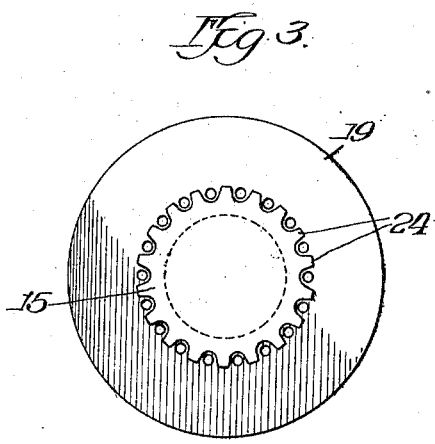
Inventor:
William Bartholomew

UNITED STATES PATENT OFFICE.

WILLIAM BARTHOLOMEW, OF CHICAGO, ILLINOIS, ASSIGNOR TO TROY LAUNDRY MACHINERY CO. LTD., OF CHICAGO, ILLINOIS, A CORPORATION OF NEW YORK.

CENTRIFUGAL-EXTRACTOR BUSHING.

1,316,076.　　　　　　　Specification of Letters Patent.　　Patented Sept. 16, 1919.

Application filed November 3, 1917. Serial No. 200,029.

*To all whom it may concern:*

Be it known that I, WILLIAM BARTHOLOMEW, a citizen of the United States, and resident of Chicago, in the county of Cook and State of Illinois, have invented certain new and useful Improvements in Centrifugal-Extractor Bushings, of which the following is a specification.

This invention relates to centrifugal extractors, and more particularly to spindle bearing bushings therefor.

One of the objects of this invention is to maintain the bearing temperature at a minimum.

Another object of the invention is to improve operating conditions of the bearings in a manner to obtain better results.

Generally speaking, these and other objects are accomplished by providing a centrifugal extractor spindle bushing having cooling fins for dissipating generated heat.

The invention is illustrated on the accompanying sheet of drawings in which,

Figure 1 is a side elevation, parts being in section, of a centrifugal extractor embodying my invention;

Fig. 2 is an enlarged detail sectional view of the spindle bearing mechanism, and Fig. 3 is an enlarged top plan view of my improved spindle bearing bushing.

Referring first to Fig. 1 of the drawings, it will be noted that I have shown a centrifugal hydro-extractor 10 having a perforated basket 11 secured to the upper end of a spindle 12, the lower end of which is mounted within a recessed portion 13 formed in the base 14 of the curb. The lower end of the spindle rotates in my improved bushing 15 and is provided with any suitable stepped bearing 16 having a curved surface rotating upon a stationary step 17 located in the bottom closed end of the bushing 15. The top of the bushing is provided with any suitable oiling device 18 and intermediate the end of the bushing it has an integrally formed laterally extending annular flange 19, the upper and lower sides of which engage bearing members 20. Each of the bearing members 20, which is in the form of a ring or annular piece of material, such as rubber or similar material, has a mating bearing 21 which is spaced from its coöperating bearing member 20 by laterally extending flanges 22 of coöperating metal retaining rings 23 which afford heat resisting sliding surfaces for relative movement of the bearing members 20 and 21. These metal rings 23, four in number, two located between each pair of bearing members above and below the bushing flange 19, have an inside diameter sufficiently larger than the outside diameter of the bearing bushing 15 to permit gyratory motion of a considerable degree. At the same time the metal rings 23 prevent the bearing members 20 and 21 coming in contact with the bearing bushing 15, thereby providing means whereby currents of air may be circulated between the bearing bushing 15 and bearing members 20 and 21 and the ring supporting members 23 to assist in maintaining a relatively low bearing temperature. The pressure exerted upon the bearing members may be regulated by adjusting the lock nut 27 with respect to the base of the curb.

The success of these centrifugal extractors to a certain degree depends upon the operating condition of the bearings. In other words, it is necessary to maintain the bearing temperature at a minimum in order to get the best results. I have found that operating conditions, so far as the bearings are concerned, are greatly improved by providing the bushing 15 with cooling fins 24 on the outer side of the bearing bushing 15, said fins preferably running vertically with respect to the bushing on opposite sides of the laterally extending flange 19. The radiating surface is thereby greatly increased and the air which is circulated through the bearing structure has an increased surface from which to absorb and carry away heat developed in the bearing structure. It is apparent that these cooling fins 24 may be arranged in various manners on the bushing to accomplish the desired results. However, I prefer to arrange them vertically as shown. It will be noted also that the flange 19 is provided with a plurality of holes arranged in a circle and connecting the grooves formed by the fins 24 upon opposite sides of the flange. Air in this way may be circulated freely through the bearing structure from one side of the flange to the other.

By means of this arrangement any heat generated around the bearings is more readily dissipated than heretofore has been the case, the operation of the machine being correspondingly improved.

It is my intention to cover any modifications of the invention coming within the scope of the following claims.

I claim:

1. A centrifugal extractor bearing bushing having a laterally extending perforated bearing flange and also cooling fins arranged on opposite sides of said flange for dissipating generated heat and directing air circulation therealong.

2. In a centrifugal extractor, the combination of a spindle bearing bushing having a laterally extending perforated flange, and bearing means spaced from said bushing and associated with said flange to take gyratory motion, said bushing having cooling fins for dissipating heat generated in the bearing structure.

3. In a centrifugal extractor, the combination of a spindle bearing bushing having a laterally extending flange said flange having openings therethrough, and bearing members operatively associated with said flange to take up gyratory motion and being spaced from the bearing bushing to permit circulation of air, said bearing bushing having cooling fins for dissipating heat generated in the bearing structure and for directing the air circulation.

4. A centrifugal extractor bearing bushing having a laterally extending flange and cooling fins on said bushing on opposite side of said flange, said flange having openings therethrough to permit air to circulate from one side of said flange to the other.

5. A centrifugal extractor bearing bushing having a laterally extending flange with an air circulating opening therethrough.

Signed at city of Chicago, State of Illinois, this 25th day of October, A. D. 1917.

WILLIAM BARTHOLOMEW.

Witnesses:
J. W. GRIFFEN,
J. E. HORSMANN.

Copies of this patent may be obtained for five cents each, by addressing the "Commissioner of Patents, Washington, D. C."